United States Patent
Chen et al.

(10) Patent No.: US 7,780,863 B2
(45) Date of Patent: Aug. 24, 2010

(54) METHOD OF FABRICATING HOLLOW WAVEGUIDE HAVING CYCLIC GEOMETRIC STRUCTURE

(75) Inventors: Chii-Chang Chen, Pingzhen (TW); Ya-Lun Tsai, Taipei (TW); Ching-Yi Chen, Banciao (TW); Jenq-Yang Chang, Taipei (TW)

(73) Assignee: National Central University, Taoyuan County (TW)

( * ) Notice: Subject to any disclaimer, the term of this patent is extended or adjusted under 35 U.S.C. 154(b) by 627 days.

(21) Appl. No.: 11/808,134

(22) Filed: Jun. 6, 2007

(65) Prior Publication Data

US 2008/0251497 A1    Oct. 16, 2008

(30) Foreign Application Priority Data

Apr. 12, 2007    (TW) .................................. 96112807

(51) Int. Cl.
*G02B 6/00* (2006.01)
*C03C 25/68* (2006.01)

(52) U.S. Cl. ........................................ 216/58; 385/147

(58) Field of Classification Search ................. 216/24, 216/58; 385/123, 129
See application file for complete search history.

(56) References Cited

U.S. PATENT DOCUMENTS

| | | | | |
|---|---|---|---|---|
| 3,973,828 | A * | 8/1976 | Onoda et al. | 385/125 |
| 4,913,505 | A * | 4/1990 | Levy | 385/147 |
| 7,133,682 | B2 * | 11/2006 | Seki et al. | 455/450 |
| 2005/0271340 | A1 * | 12/2005 | Weisberg et al. | 385/123 |

* cited by examiner

*Primary Examiner*—Binh X Tran
*Assistant Examiner*—Patti Lin
(74) *Attorney, Agent, or Firm*—Jackson IPG PLLC; Demian K. Jackson

(57) ABSTRACT

A waveguide has a hollow center. The waveguide has dielectric tubes which have a geometric arrangement, like a triangle-lattice arrangement. A laser transmitted in the waveguide is confined and is emitted out with a narrow expending angle. Hence, the laser is emitted straightly forwarded and has a low power loss. The present invention is suitable for using in a high-power laser and obtaining a directive microwave.

10 Claims, 18 Drawing Sheets

METHOD OF FABRICATING HOLLOW WAVEGUIDE HAVING CYCLIC GEOMETRIC STRUCTURE

FIELD OF THE INVENTION

The present invention relates to fabricating a hollow waveguide; more particularly, relates to obtaining an electromagnetic beam straightly emitted, a laser having a narrow expanding angle and a microwave beam having a high power and a high directivity.

DESCRIPTION OF THE RELATED ARTS

Concerning a dual-band optical transceiver, a normal optical sub-module comprises a light-emitting end and a light-receiving end; and the main device for emitting a light is a photodiode. However, there is a common problem for the light-emitting end and the light-receiving end, which is a problem of optical coupling alignment.

A problem that often happens to the light-emitting end is that light emitted from a laser diode has to use a plurality of optical filters to be coupled into a single-mode fiber. Because a light spot of a laser is getting bigger along emission in a free space, the final laser coupled into the single-mode fiber becomes very weak. To solve this problem, micro-lenses are usually used to enhance a numerical aperture for improving an optical efficiency. However, the lenses used would increase cost of the optical sub-module and make the assembly complex.

There are two types of dual-band optical transceivers, one is a flat type and another is a cylindrical type. The optical sub-module of a flat waveguide has three main optical coupling interfaces, which include a coupling interface between a laser diode and an optical flat waveguide; a coupling interface of spectral filters between an optical flat waveguide and another optical flat waveguide; and a coupling interface between an optical flat waveguide and a single-mode fiber. These three interfaces have a common problem on coupling alignment; and, because they have different waveguide types, other problems on mode matching and coupling have arisen. These make it difficult to enhance the coupling efficiency.

Concerning the cylindrical optical sub-module, lenses are usually used to collect light for solving the problem of light coupling in free space, where a numerical aperture of the lenses is used to receive a light field having a big angle. The allowance on coupling alignment is also compensated through the lenses. Yet, in actual applications, because the wavelengths needed for fiber communications are 1.3 and 1.5 micrometers, coupling efficiency becomes low owing to alignment deviation; and, thus, power and quality of the light emitted from the sub-module is affected. These make it hard to fabricate lenses required for a waveband. And the cost of the sub-module is thus raised owing to the lenses used. Hence, the prior arts do not fulfill all users' requests on actual use.

SUMMARY OF THE INVENTION

The main purpose of the present invention is to obtain a hollow waveguide having multiple functions, where, on light coupling, an electromagnetic wave has a shape like a Bessel function and is straightly emitted.

A second purpose of the present invention is to narrow a laser expending angle and to obtain a lens for a high-power laser, where a dielectric lens is replaced and a laser obtained is straightly emitted, and the lens has a narrow beam and a low power loss.

A third purpose of the present invention is to obtain a highly directive microwave beam for fulfilling a directivity requirement of an electromagnetic wave.

To achieve the above purposes, the present invention is a method of fabricating a hollow waveguide having a cyclic geometric structure, where two dielectric materials are obtained to be deposited on a substrate for obtaining two films having different refractive indexes; a ring-like waveguide pattern is etched on the film and pairs of the two films are arranged to form a hollow waveguide; and an electromagnetic wave is transmitted in a confined hollow center of the hollow waveguide to obtain an electromagnetic beam straightly emitted after leaving the hollow waveguide. Accordingly, a novel method of fabricating a hollow waveguide having a cyclic geometric structure is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the flow view showing the preferred embodiment according to the present invention;

DESCRIPTION OF THE PREFERRED EMBODIMENT

The following description of the preferred embodiment is provided to understand the features and the structures of the present invention.

Please refer to FIG. 1 to FIG. 8C, which are a flow view, a perspective view and a top-down view showing a preferred embodiment; a view showing the preferred embodiment with circles and a length increased; a view showing the similarity to a Bessel function; a sectional view showing a hollow waveguide; a view showing the light-coupling field having a Bessel-function shape; and views showing taper waveguide structures according to the present invention. As shown in the figures, the present invention is a method of fabricating a hollow waveguide having a cyclic geometric structure, comprising the following steps:

(a) Obtaining two materials 1: A first material and a second material are obtained, where the first material and the second material have different refractive indexes; and the first and the second dielectric materials are separately Si, GaAs, GaN, InP, InN, Ge, fluorinated silica glass (FSG), $SiO_2$, $TiO_2$, $ZnO_2$, $LiNbO_3$, $BaTiO_3$, SiN, SiC, carbon rich, a group III metal, a group III-V metal, a II-VI metal, alumina, Teflon, a stone, a wood, ceramics, liquid crystal, gold, silver, copper, iron, tin, aluminum, platinum, a metal mixture, plastics, plastic steel, air, water or alcohol.

(b) The materials having the first and the second refractive indexes can be obtained through film laminating, injection molding, lathing or alloying.

(c) Depositing two films with different refractive indexes 2: A film deposition is processed to obtain a film having a first refractive index and another film having a second refractive index on an object. Therein, the film having the first refractive index is made of the first material; the film having the second refractive index is made of the second material;

(d) Etching a film with a ring-like waveguide pattern 3: After depositing the film having the second refractive index, a ring-like waveguide pattern is etched on the film having the second refractive index based on the film having the first refractive index (e) Obtaining films 4: Then, step (c) and step (d) are repeated a few times to obtain a plurality of films, consisting of pairs of the film having the first refractive index and the film having the second refractive index.

Figure 1:
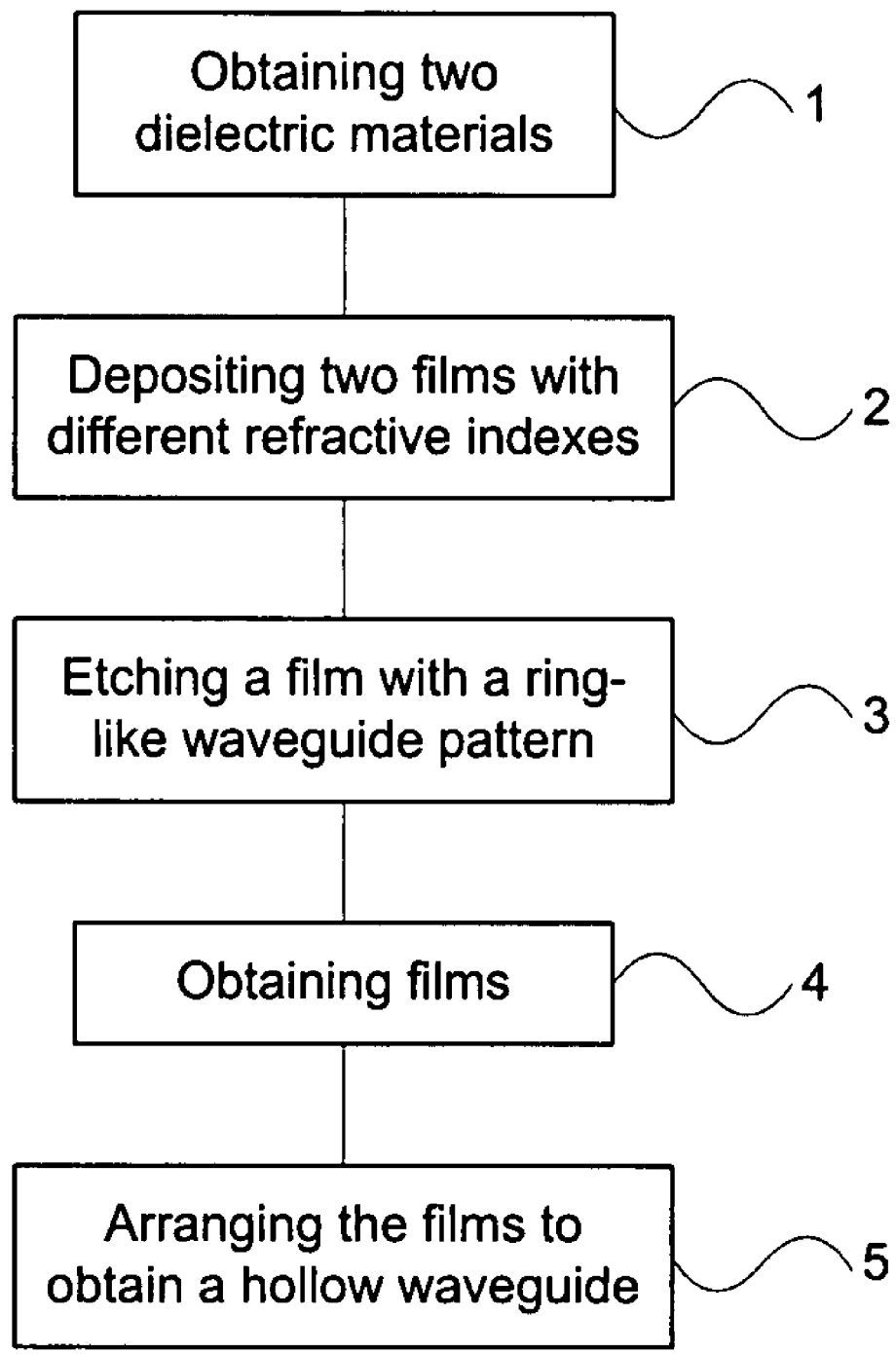
Figure 2:
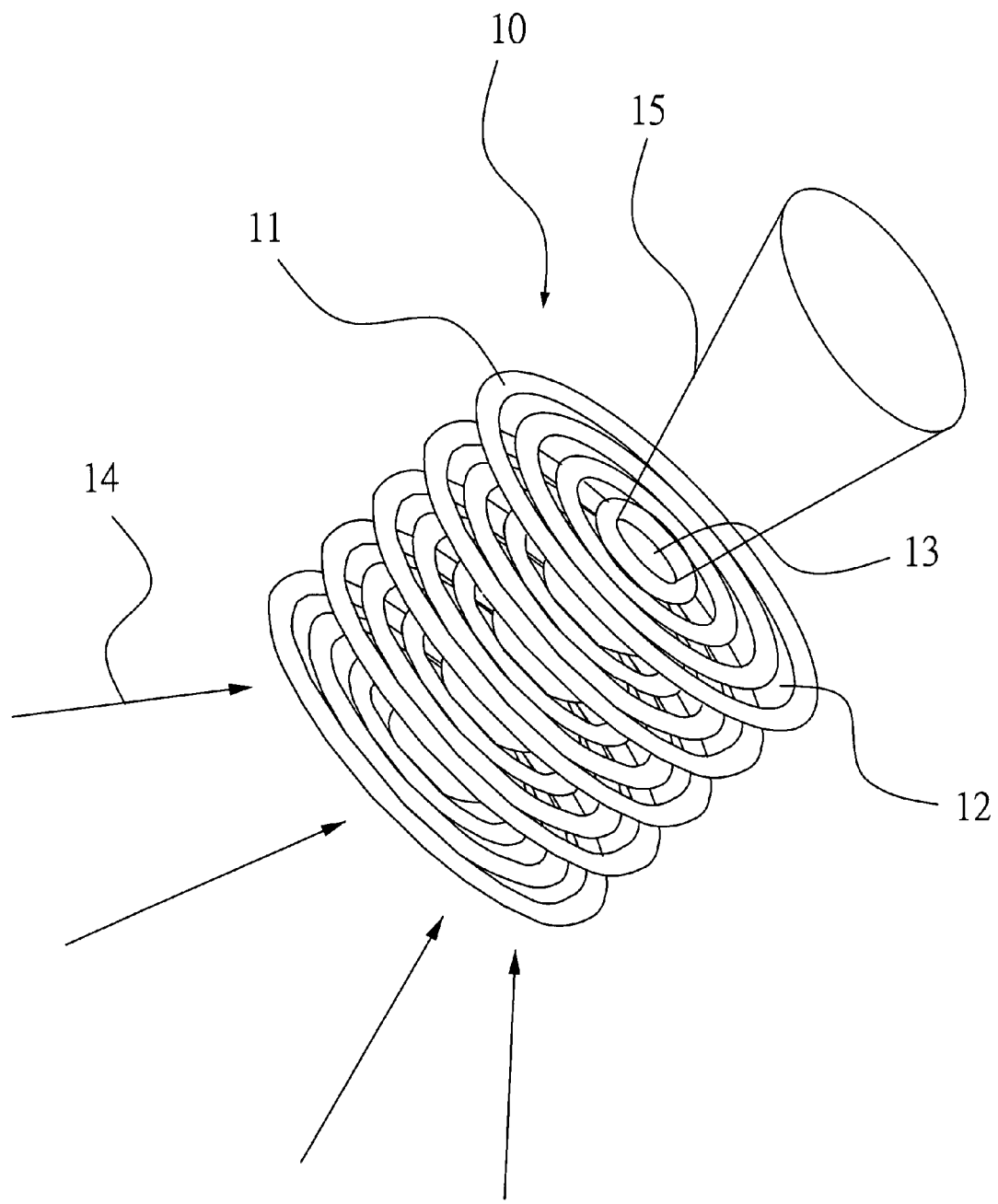
FIG. 2 is the perspective view showing the preferred embodiment.
Figure 3:
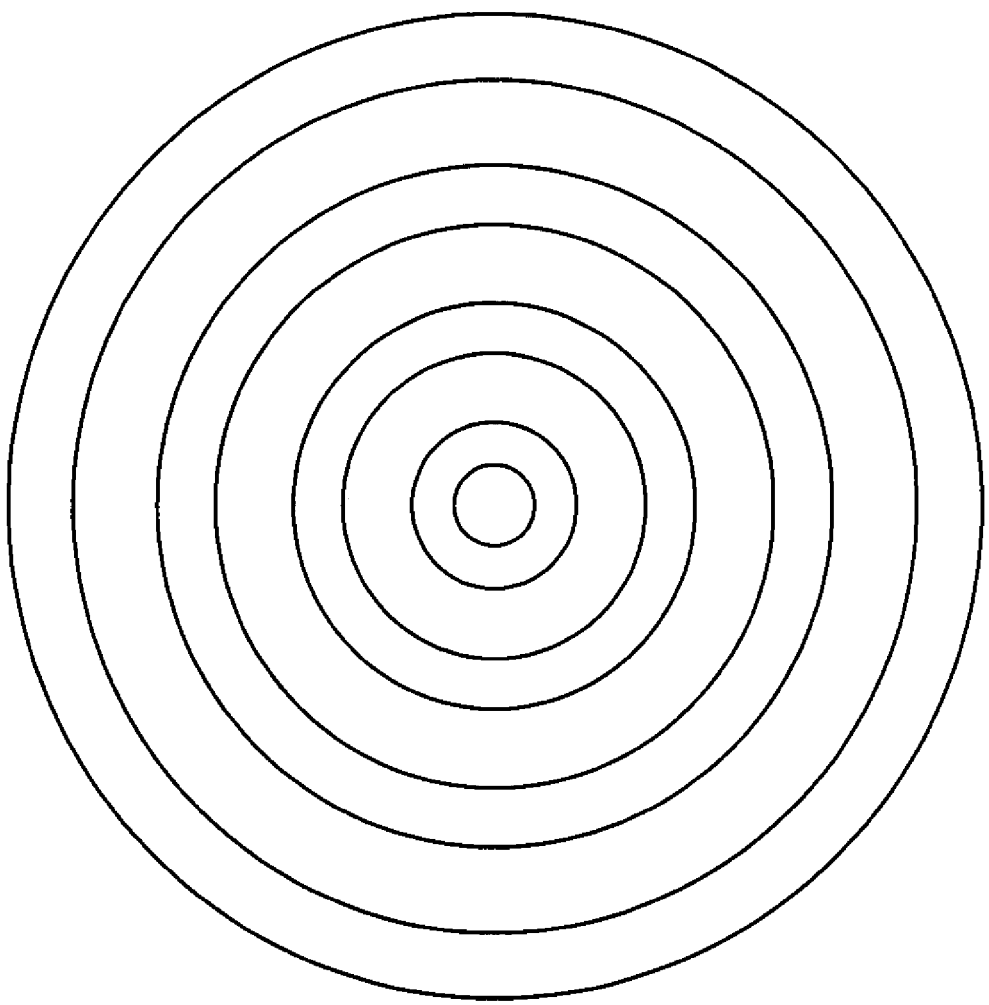
FIG. 3 is the top-down view showing the preferred embodiment.
Figure 4:
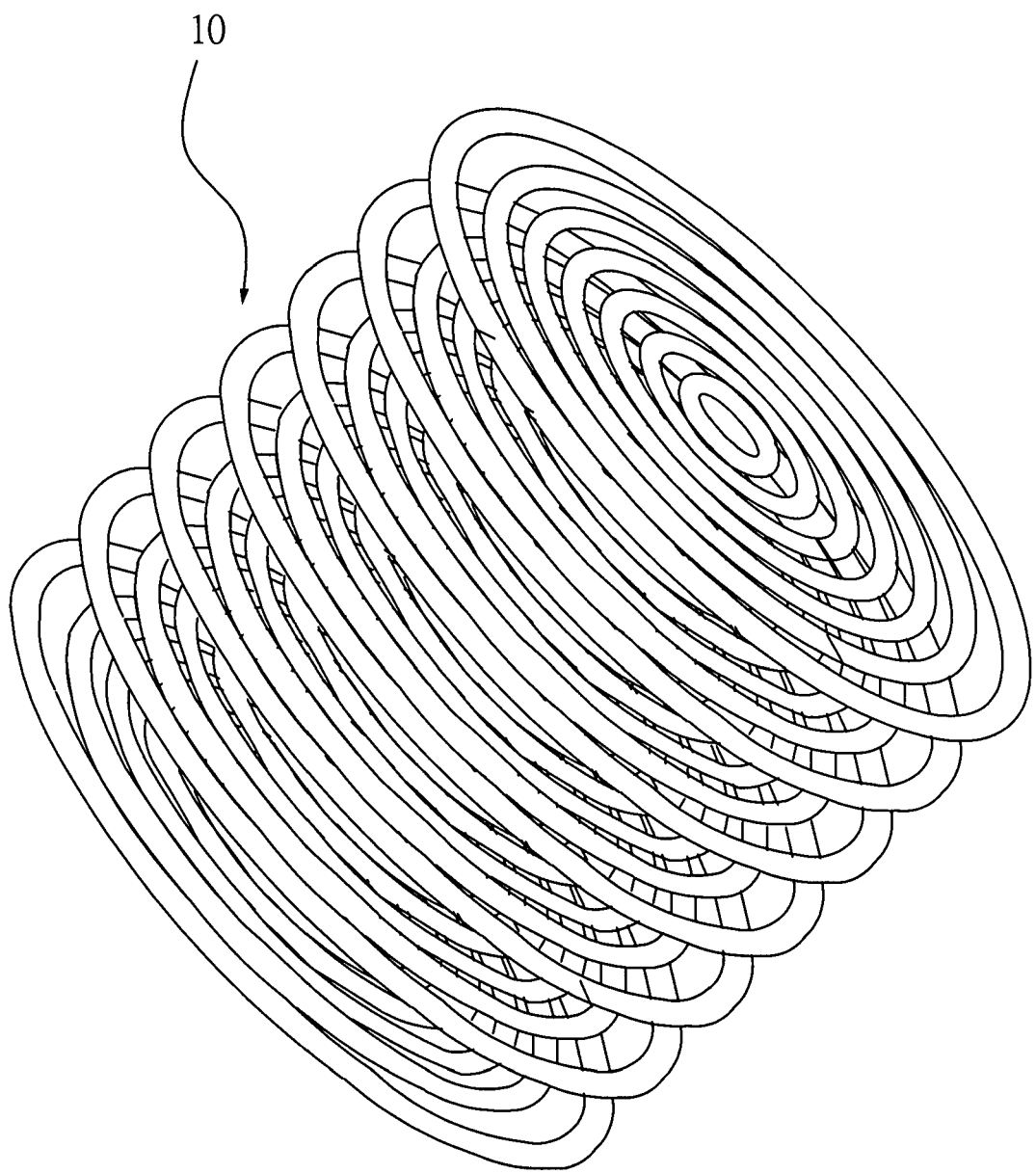
FIG. 4 is the view showing the preferred embodiment with circles and a length increased.
Figure 5:
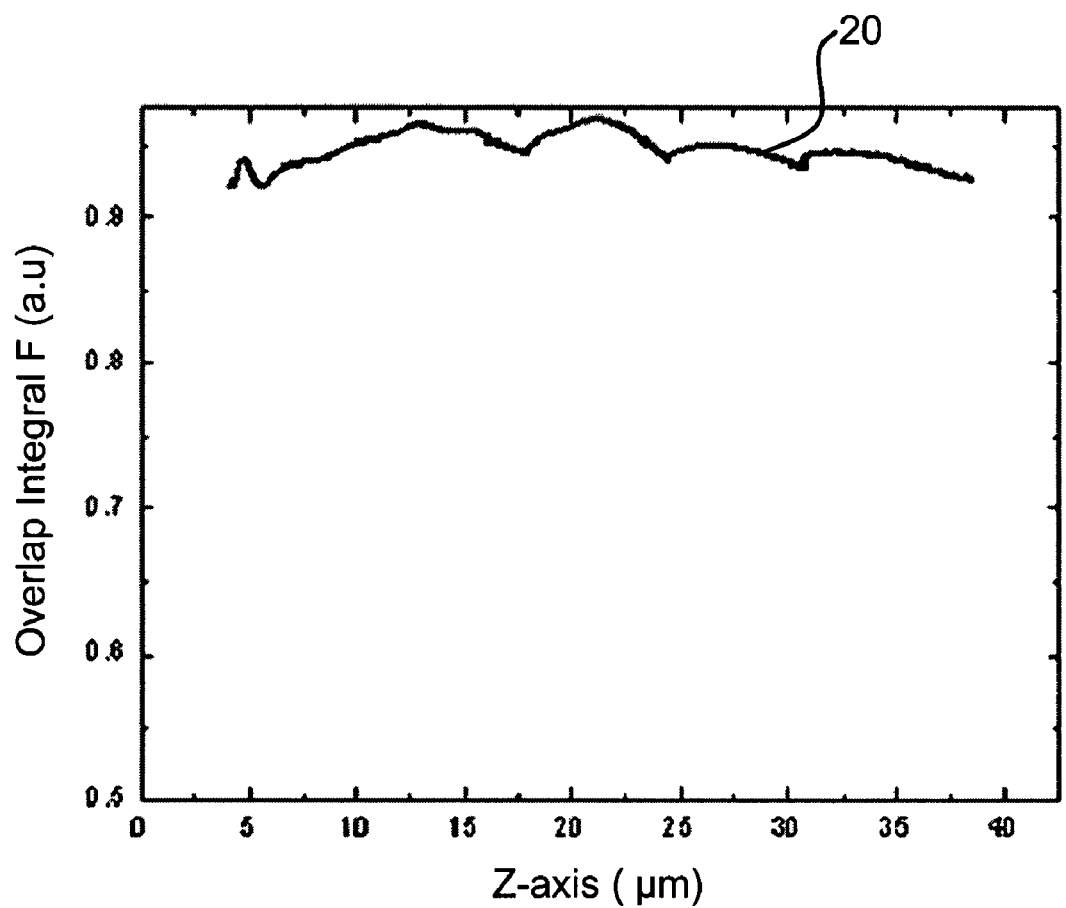
FIG. 5 is the view showing the similarity to a Bessel function.
Figure 6:
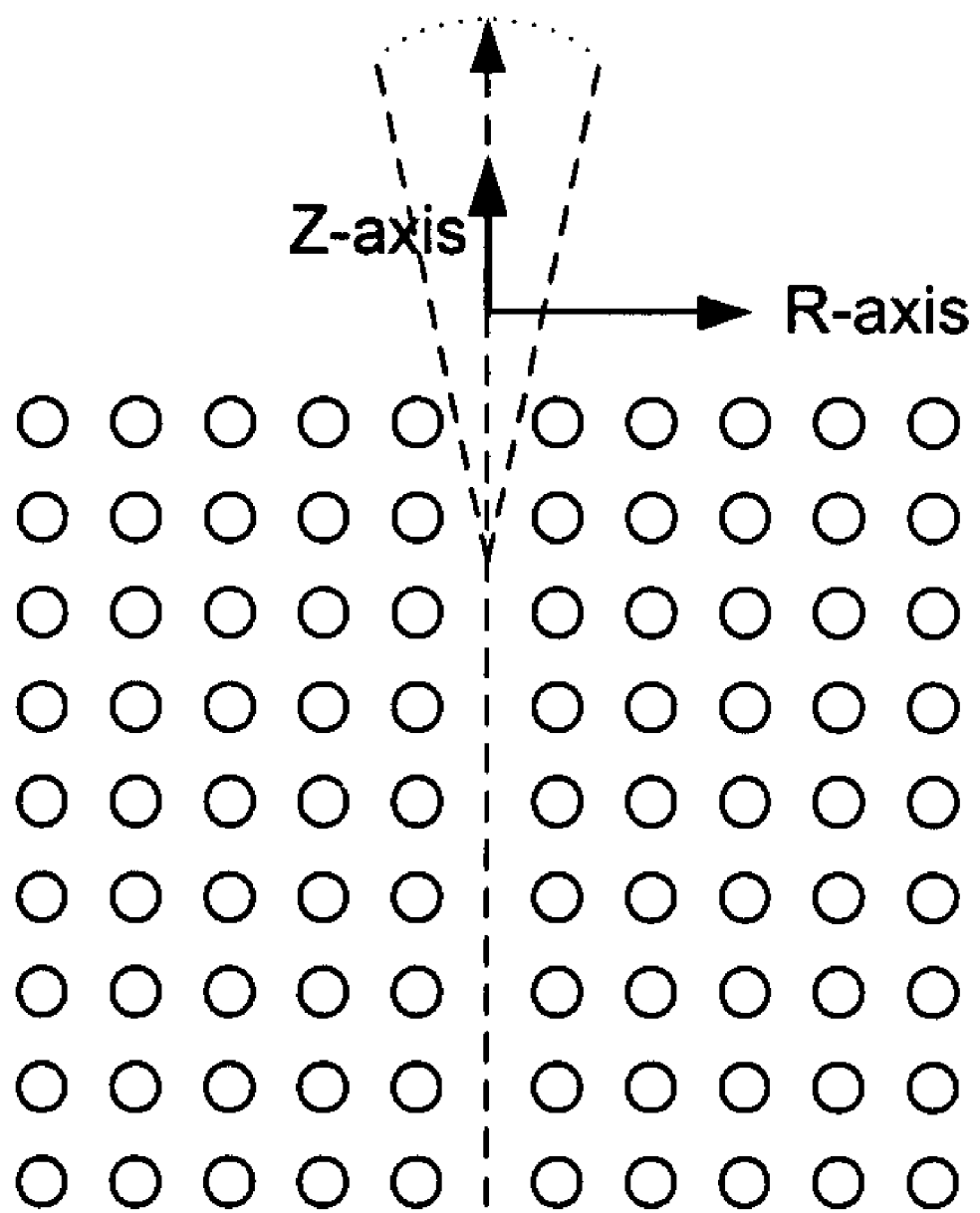
FIG. 6 is the sectional view showing the hollow waveguide.

(f) Arranging the films to obtain a hollow waveguide 4: In the end, the films are arranged cyclically to obtain a hollow waveguide 10 having a polygonal or cylindrical structure, where the ring-like waveguide patterns in the hollow waveguide form a plurality of dielectric tubes 11 or comprise air; and an inter-space is obtained between the dielectric tubes 11. A cyclic waveguide is thus formed at center of the hollow waveguide 10 to confine an electromagnetic wave 14. After the electromagnetic wave 14 leaves the hollow waveguide 10, an electromagnetic beam 15 is kept transmitting straightly forward (as shown in FIG. 6). Therein, the dielectric tubes 11 have the same diameter (as shown in FIG. 3); the structure of the hollow waveguide 10 is lengthened or contains more dielectric tubes according to actual needs (as shown in FIG. 4); and, the inter-space contains Si, GaAs, GaN, InP, InN, Ge, FSG, $SiO_2$, $TiO_2$, $ZnO_2$, $LiNbO_3$, $BaTiO_3$, SiN, SiC, carbon rich, a group III metal, a group III-V metal, a II-VI metal, alumina, Teflon, a stone, a wood, ceramics, liquid crystal, gold, silver, copper, iron, tin, aluminum, platinum, a metal mixture, plastics, plastic steel, air, water or alcohol.

Thus, a novel method of fabricating a hollow waveguide having a cyclic geometric structure is obtained.

Figure 7:
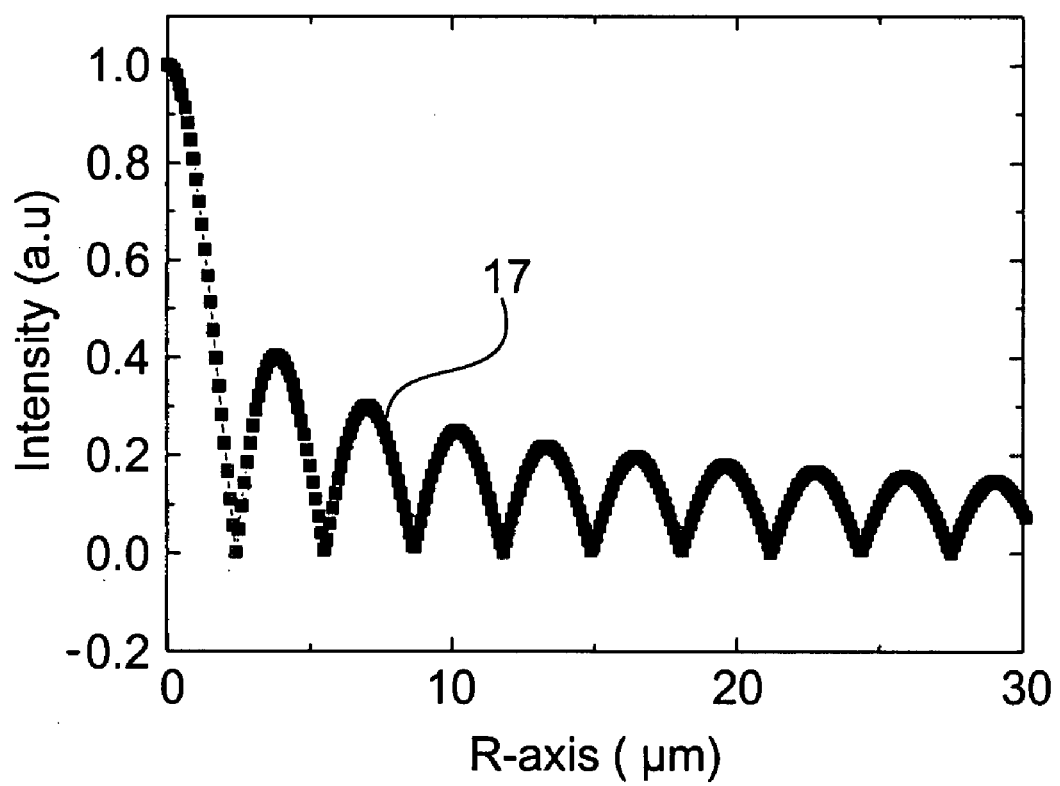
FIG. 7 is the view showing the light-coupling field having the Bessel-function shape.
Figure 8A:
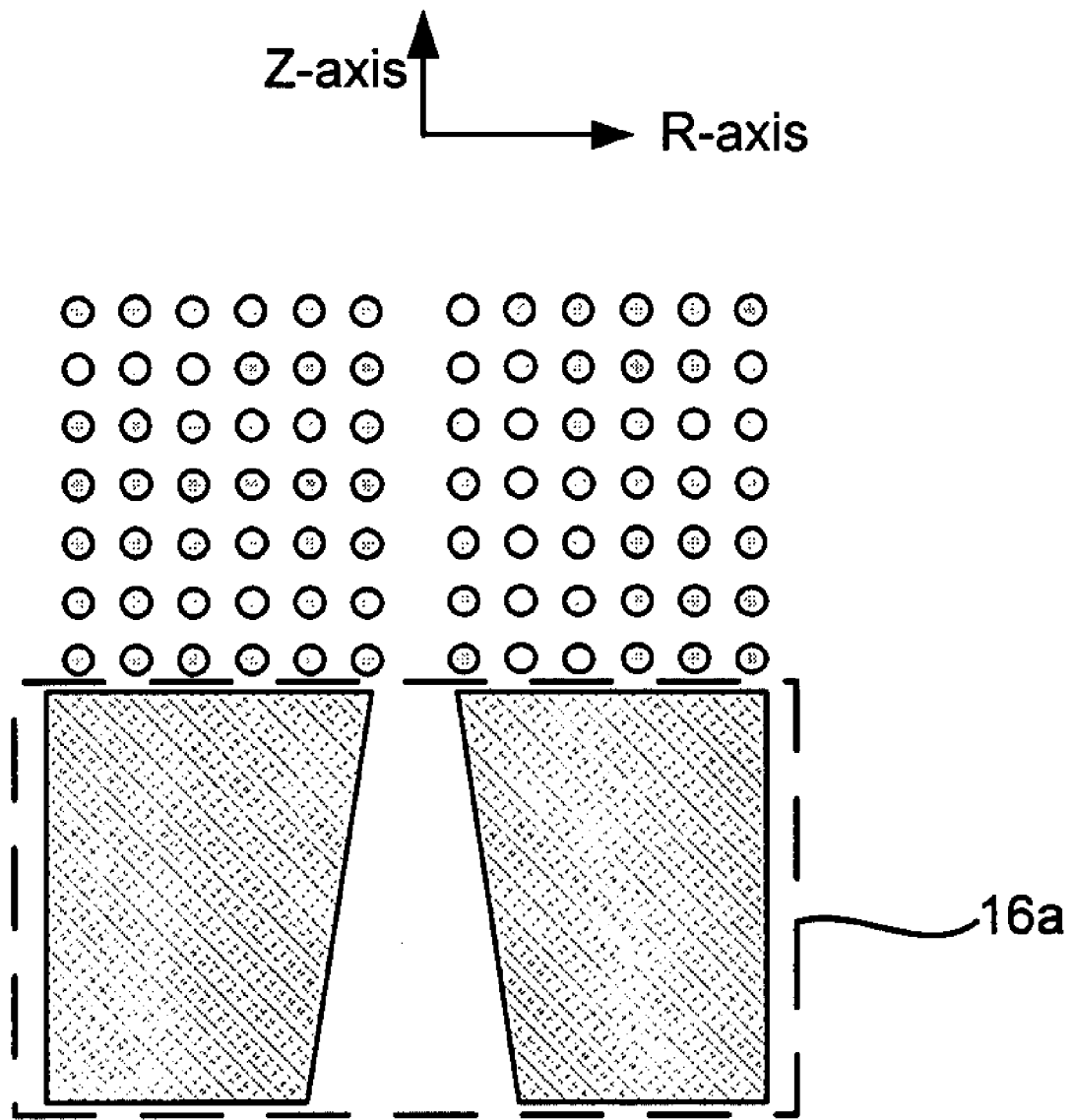
FIG. 8A to FIG. 8C are views showing taper waveguide structures.
Figure 8B:
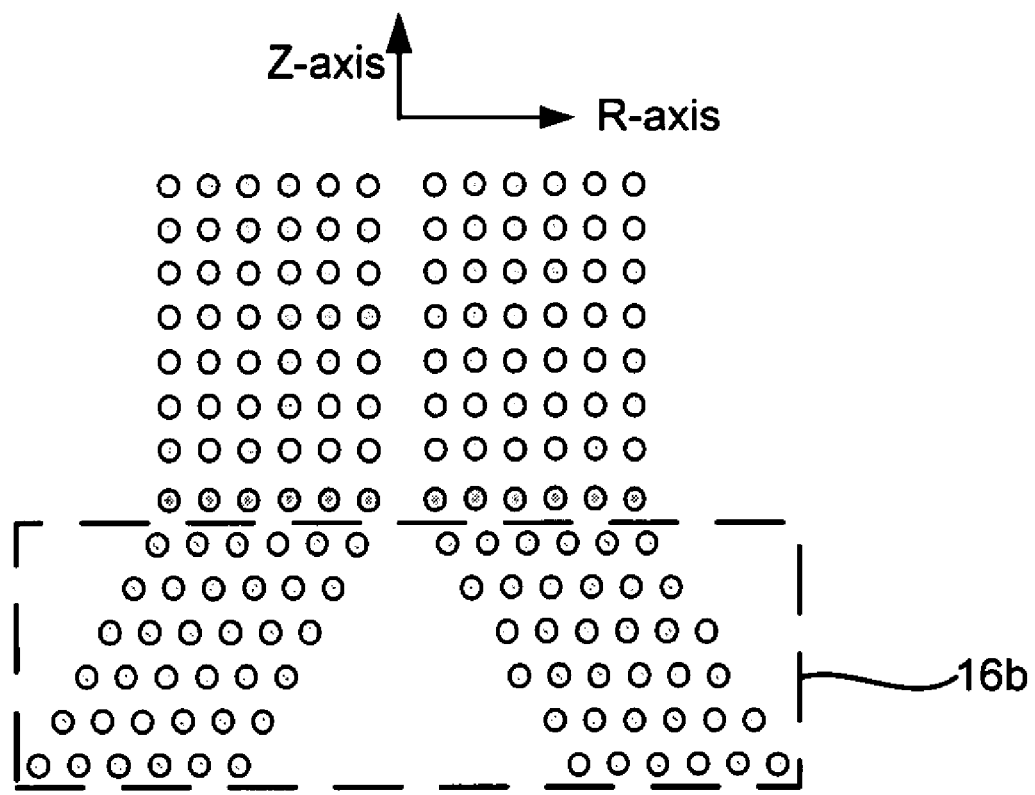
Figure 8C:
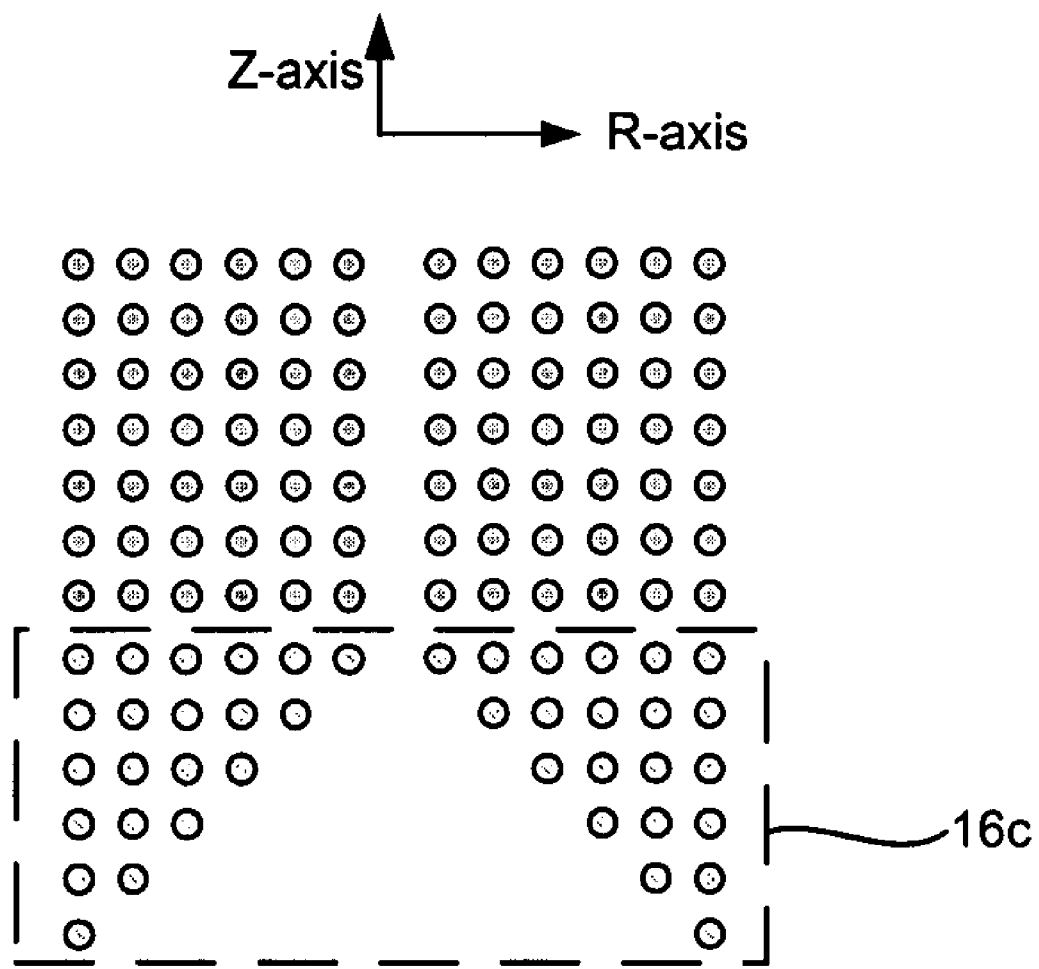

When using the present invention, a hollow waveguide 10 is obtained through the above steps and the electromagnetic beam 15 has a light-coupling field having a shape like a Bessel function with a 90% similarity 20. The hollow waveguide can be further applied with an taper waveguide structure 16a, 16b, 16c at an entrance having a diameter of merely 2 millimeters (as shown in FIG. 8A to FIG. 8C), so that light can enter the waveguide more easily. When the light passes through the hollow waveguide 10, the light-coupling aperture 13, which has a diameter of merely 2 millimeters, effectively lengthens the distance for light to transmit; and reduces power loss of the light. Because the light field is cyclic and the sectional surfaces of waveguides are located at the lowest position of a Bessel function 17 (as shown in FIG. 7), the hollow waveguide 10 can be used as a lens for a surface emitting laser in an optical communication. Therein, the light field is modified and the expending angle of the laser is greatly reduced to form a high power laser with a straight emission, a narrow beam and a low power loss. Or, the hollow waveguide 1 can be used as a normal lens made through lithography, film laminating, injection molding, lathing or alloying.

Besides, the hollow waveguide 10 can be used to obtain a microwave beam with a high directivity. A microwave beam is obtained according to the present invention for emitting or receiving microwaves of meter, decimeter, centimeter or millimeter not only has an improved directivity, but also obtains efficiencies in emitting or receiving with security and anti-noise. Concerning a sonar application, the hollow waveguide 10 can be also used as an amplifier or a sonar generator. Hence, the hollow waveguide 10 has multiple functions.

Figure 9:
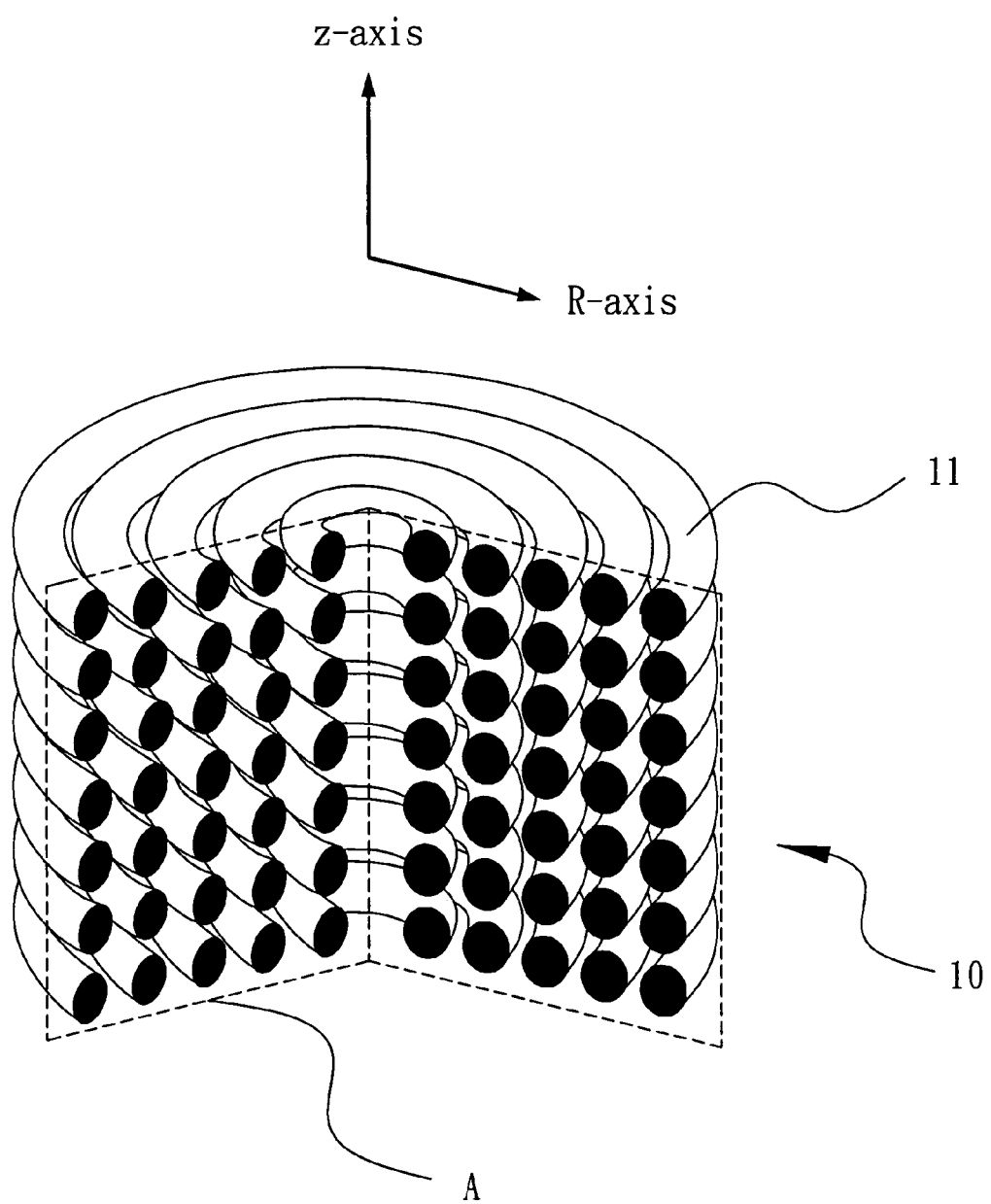
FIG. 9 is the sectional view showing the first 3-dimensional (3-D) structure.
Figure 10:
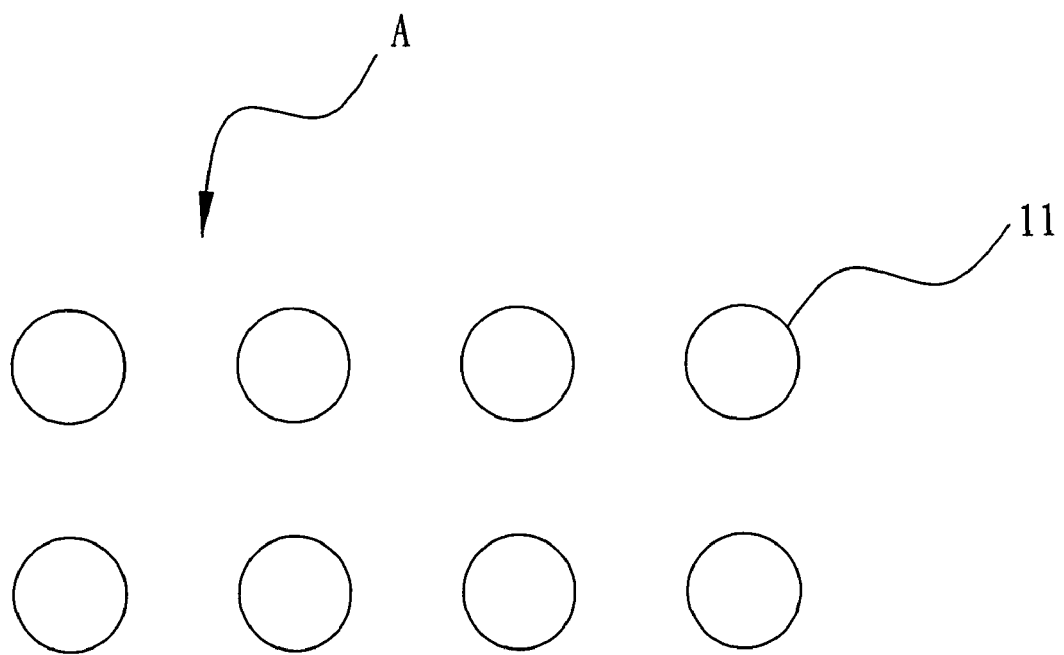
FIG. 10 is the detail view showing the A in FIG. 9.
Figure 11:
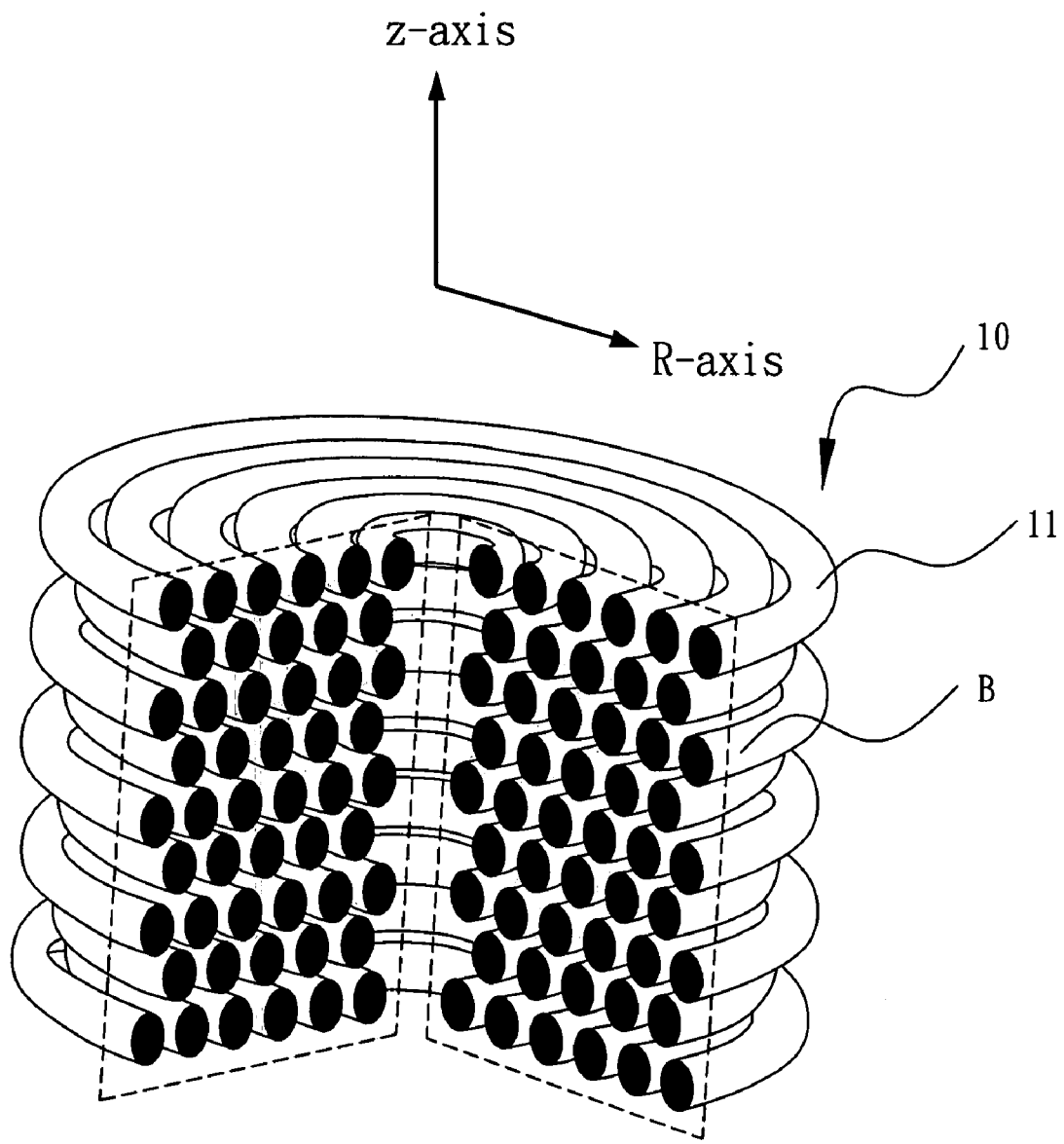
FIG. 11 is the sectional view showing the second 3-D structure.
Figure 12:
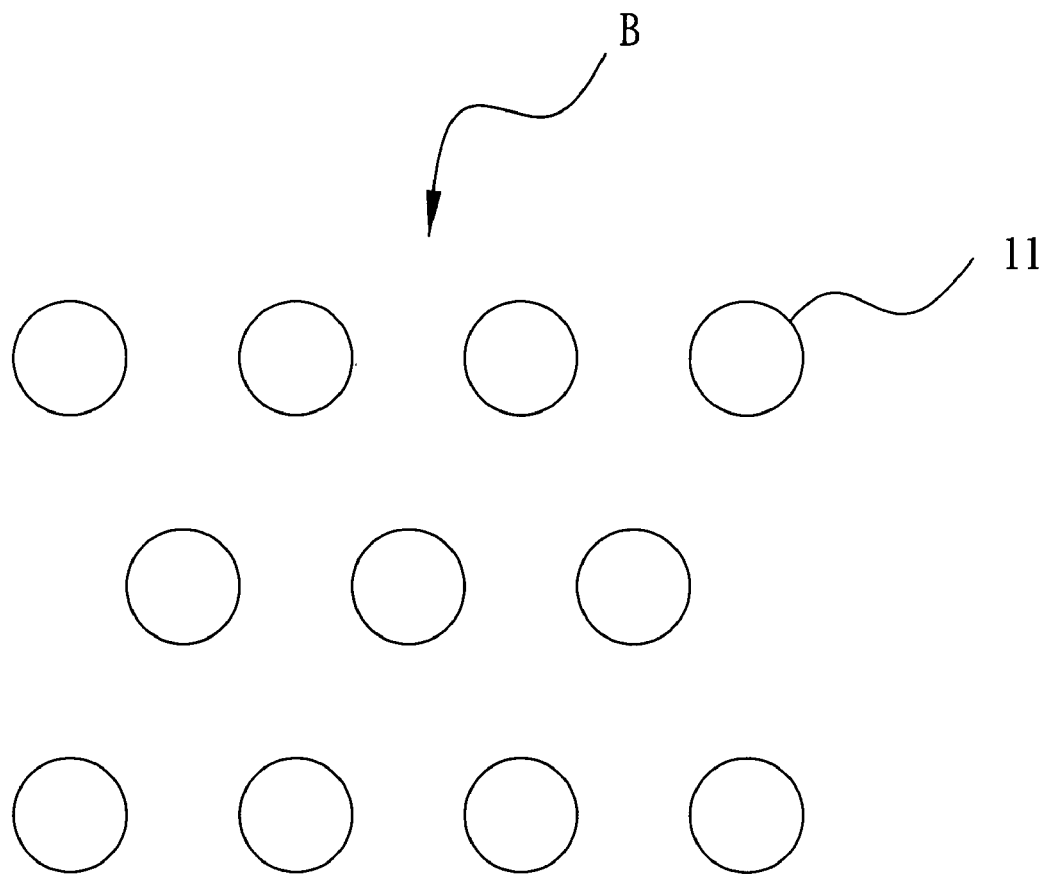
FIG. 12 is the detail view showing the B in FIG. 11.
Figure 13:
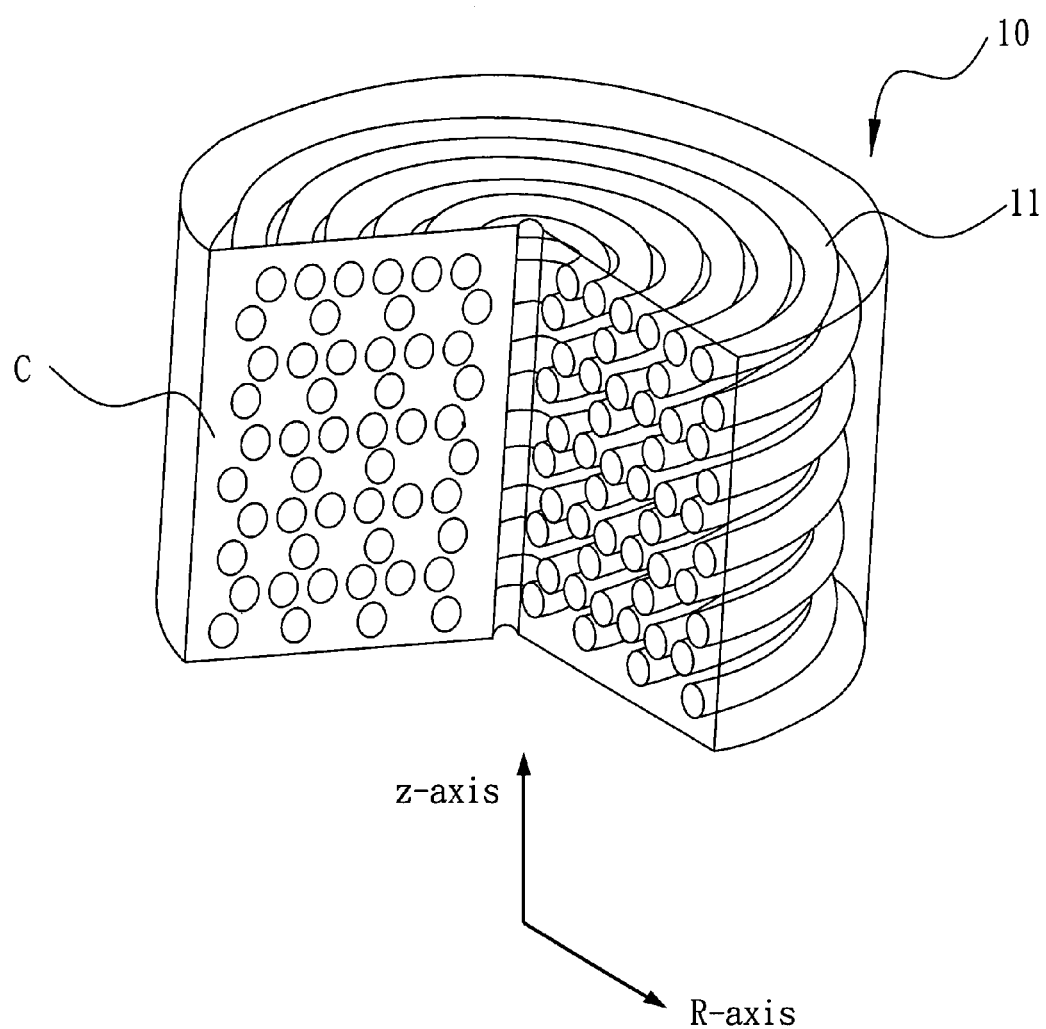
FIG. 13 is the sectional view showing the third 3-D structure.
Figure 14:
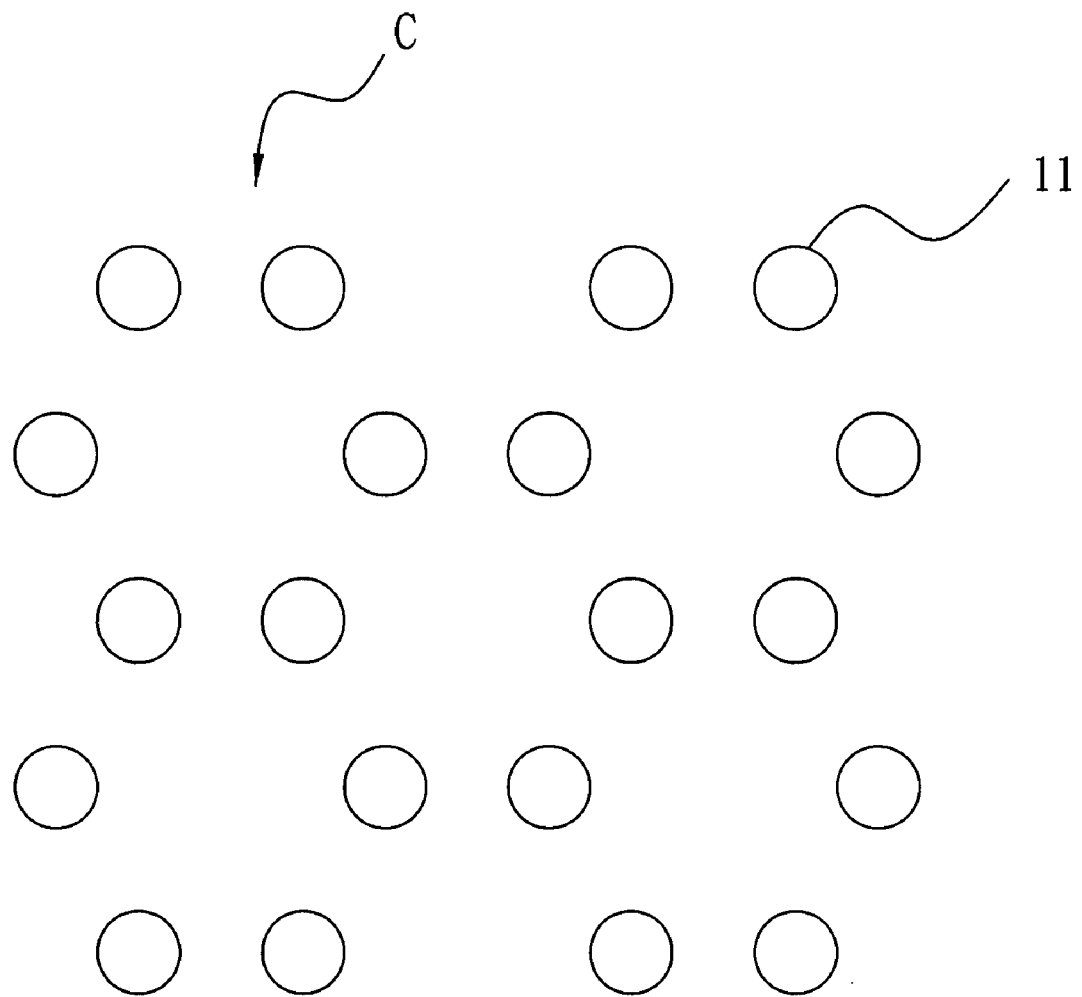
FIG. 14 is the detail view showing the C in FIG. 13.
Figure 15:
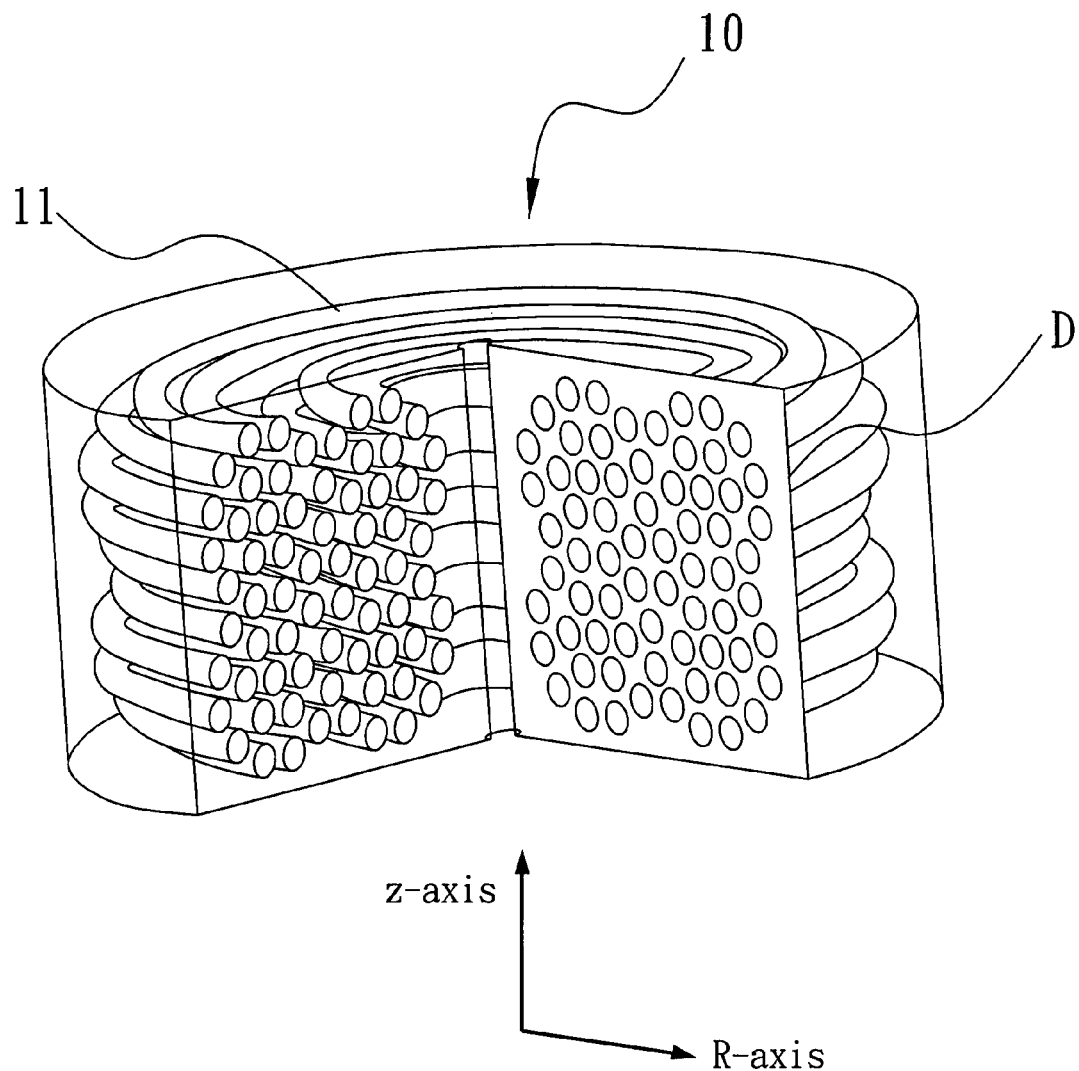
FIG. 15 is the sectional view showing the fourth 3-D structure.
Figure 16:
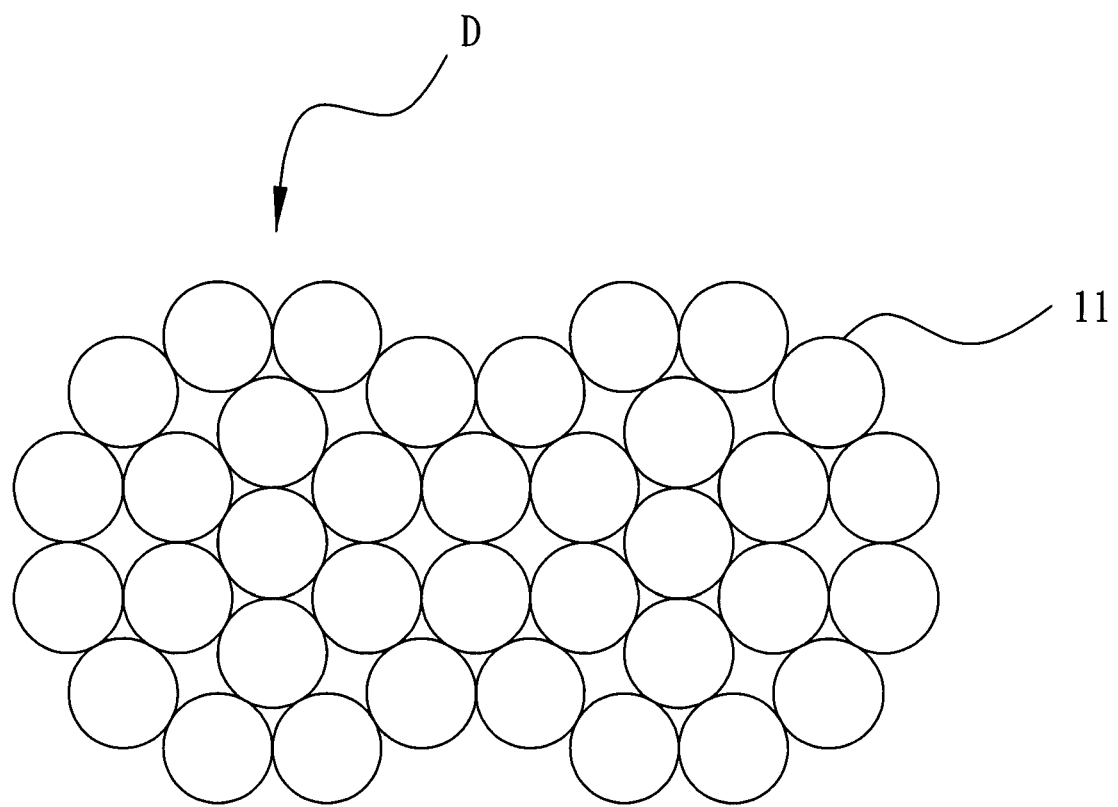
FIG. 16 is the detail view showing the D in FIG. 15.

Please refer to FIG. 9 to FIG. 16, which are a sectional view showing a first 3-dimensional (3-D) structure and a detail view of A in FIG. 9; a sectional view showing a second 3-D structure and a detail view of B in FIG. 11; a sectional view showing a second 3-D structure and a detail view of C in FIG. 13; and a sectional view showing a second 3-D structure and a detail view of D in FIG. 15. As shown in the figures, the hollow waveguide 10 comprises a plurality of dielectric tubes 11, and the dielectric tubes 11 have a square-lattice arrangement, a triangle-lattice arrangement, a quasi-crystal arrangement or a quasi-periodic arrangement.

To sum up, the present invention is a method of fabricating a hollow waveguide having a cyclic geometric structure, where problems of a big laser expending angle and power loss of a high power laser on using a dielectric lens are solved; a laser having a straight emission, a narrow beam and a low power loss is obtained; and a microwave beam with a high directivity for electromagnetic wave is provided.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a hollow waveguide having a cyclic geometric structure, comprising steps of:

(a) obtaining a first material and a second material, said first material and said second material having two different refractive indexes separately;

(b) processing a film deposition to obtain a first film having a first refractive index and a second film having a second refractive index on an object, said first film having said first refractive index being made of said first material, said second film having said second refractive index being made of said second material;

(c) after depositing said second film having said second refractive index, etching a ring-like waveguide pattern on said object deposited with said first film having said first refractive index and said second film having said second refractive index;

(d) repeating step (b) and step (c) for a plurality of times to obtain a plurality of films consisting of pairs of the first film having the first refractive index and the second film having the second refractive index; and (e) arranging said plurality of film pairs to obtain a hollow waveguide having a cyclic geometric structure of the ring-like waveguide patterns, wherein an electromagnetic wave is transmitted in a confined hollow center of said hollow waveguide.

2. The method according to claim 1,
wherein said first material is selected from the group consisting of Si, GaAs, GaN, InP, InN, Ge, fluorinated silica glass (FSG), $SiO_2$, $TiO_2$, $ZnO_2$, $LiNbO_3$, $BaTiO_3$, SiN, SiC, carbon rich, a group III metal, a group III-V metal, a II-VI metal, alumina, Teflon, a stone, a wood, ceramics, liquid crystal, gold, silver, copper, iron, tin, aluminum, platinum, a metal mixture, plastics, plastic steel, air, water and alcohol.

3. The method according to claim 1,
wherein said second material is selected from the group consisting of Si, GaAs, GaN, InP, InN, Ge, FSG, $SiO_2$, $TiO_2$, $ZnO_2$, $LiNbO_3$, $BaTiO_3$, SiN, SiC, carbon rich, a group III metal, a group III-V metal, a II-VI metal, alumina, Teflon, a stone, a wood, ceramics, liquid crystal, gold, silver, copper, iron, tin, aluminum, platinum, a metal mixture, plastics, plastic steel, air, water and alcohol.

4. The method according to claim 1,
wherein said object is selected from a group consisting of a substrate and a device.

5. The method according to claim 1,
wherein said first film having said first refractive index and said second film having said second refractive index are obtained through a method further selected from a group consisting of lithography, film laminating, injection molding, lathing and alloying.

6. The method according to claim 1,
wherein said hollow waveguide has a light-coupling field having a shape of a Bessel-like function.

7. The method according to claim 1,
wherein said hollow waveguide further has an taper waveguide structure added at a light entrance of said hollow waveguide.

8. The method according to claim 1,
wherein a dielectric tube is obtained in said ring-like waveguide patterns.

9. The method according to claim 8,
wherein an inter-space is arranged between the dielectric tubes and wherein the dielectric tubes have an arrangement selected from a group consisting of a square-lattice arrangement, a triangle-lattice arrangement, a quasi-crystal arrangement and a quasi-periodic arrangement.

10. The method according to claim 9,
wherein the inter-space has a material selected from the group consisting of Si, GaAs, GaN, InP, InN, Ge, FSG, $SiO_2$, $TiO_2$, $ZnO_2$, $LiNbO_3$, $BaTiO_3$, SiN, SiC, carbon rich, a group III metal, a group III-V metal, a II-VI metal, alumina, Teflon, a stone, a wood, ceramics, liquid crystal, gold, silver, copper, iron, tin, aluminum, platinum, a metal mixture, plastics, plastic steel, air, water and alcohol.

* * * * *